(12) United States Patent
Freeman et al.

(10) Patent No.: US 8,308,825 B2
(45) Date of Patent: Nov. 13, 2012

(54) HIGH VOLUMETRIC EFFICIENCY ANODES FOR ELECTROLYTIC CAPACITORS

(75) Inventors: Yuri Freeman, Greer, SC (US); Philip M. Lessner, Newberry, SC (US); Jeffrey Poltorak, Fountain Inn, SC (US); Steven C. Hussey, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 360 days.

(21) Appl. No.: 12/636,120

(22) Filed: Dec. 11, 2009

(65) Prior Publication Data

US 2010/0092326 A1     Apr. 15, 2010

Related U.S. Application Data

(62) Division of application No. 12/118,831, filed on May 12, 2008, now abandoned.

(51) Int. Cl.
*H01G 9/00* (2006.01)
(52) U.S. Cl. ....................................................... 29/25.03
(58) Field of Classification Search ........................ None
See application file for complete search history.

(56) References Cited

U.S. PATENT DOCUMENTS

| 4,537,641 | A | 8/1985 | Albrecht et al. | 148/11.5 |
| 5,825,611 | A | 10/1998 | Pozdeev | 361/524 |
| 5,949,639 | A | 9/1999 | Maeda et al. | |
| 6,312,642 | B1 | 11/2001 | Fife | |
| 6,410,083 | B1 | 6/2002 | Pozdeev-Freeman | 427/216 |
| 6,447,570 | B1 | 9/2002 | Pozdeev-Freeman | 75/245 |
| 6,554,884 | B1 | 4/2003 | Tripp et al. | 75/252 |
| 2009/0185329 | A1* | 7/2009 | Breznova et al. | 361/529 |

FOREIGN PATENT DOCUMENTS

DE     19831280 A1     1/2000

OTHER PUBLICATIONS

Ketterl, Supplemental European Search Report, EP09747358, Apr. 29, 2011.
U.S. Appl. No. 12/118,831, filed May 12, 2008 by Freeman et al. (Parent of this divisional).

* cited by examiner

*Primary Examiner* — Seahvosh Nikmanesh
(74) *Attorney, Agent, or Firm* — Joseph T. Guy; Nexsen Pruet, LLC

(57) ABSTRACT

A method for treating anodes of refractory valve metals by deoxidizing the anodes using Mg in an oven, prior to sintering. The process limits free oxygen in the metal compact and improves performance of a capacitor, especially with regards to rated voltage.

26 Claims, 2 Drawing Sheets

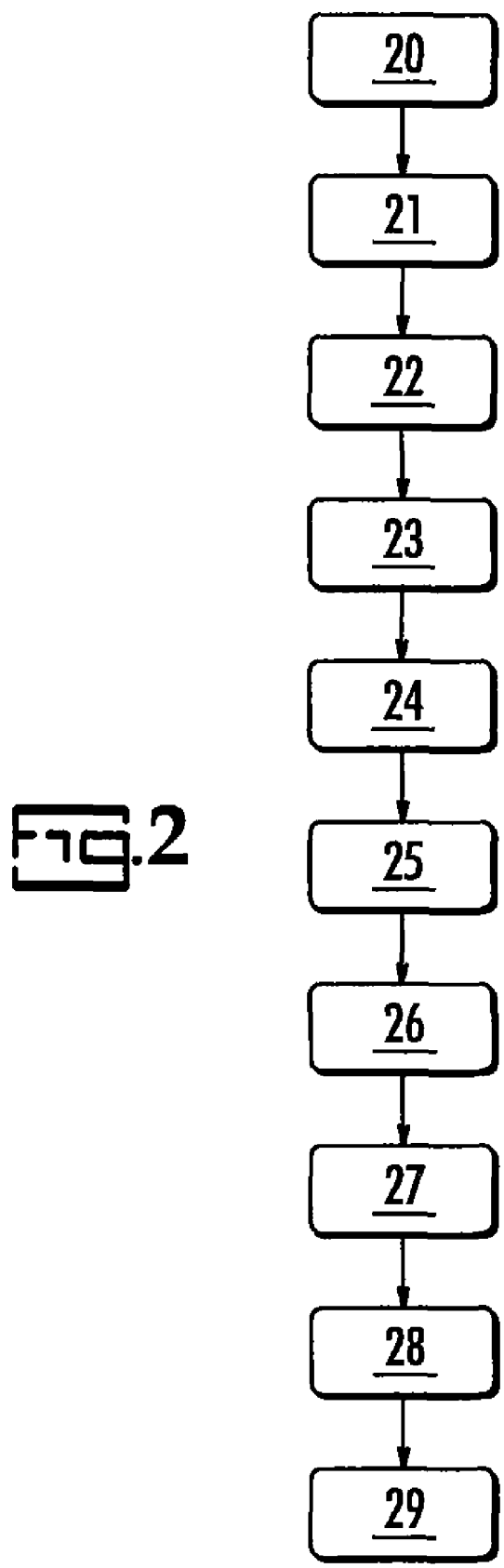

HIGH VOLUMETRIC EFFICIENCY ANODES FOR ELECTROLYTIC CAPACITORS

CROSS-REFERENCE TO RELATED APPLICATIONS

This application is a divisional application of U.S. patent application Ser. No. 12/118,831 filed May 12, 2008 now abandoned.

FIELD OF THE INVENTION

This invention relates to methods for formation of refractory valve metal-based anodes with improved volumetric efficiency specifically for application in electrolytic capacitors and capacitors formed thereby.

BACKGROUND AND PRIOR ART

There is an ongoing effort in the electronics industry to achieve increasing functionality in a decreased case size. This desire has placed an ongoing burden on component manufacturers to achieve ever more functionality with minimal size. Towards this goal the instant application is primarily focused on improved capacitors, and particularly electrolytic capacitors.

In general, a capacitor comprises an anode and cathode separated by a dielectric. The anode is typically manufactured by pressing and sintering the powder. An anode lead extends from the anode. The dielectric is formed on the anode and the cathode is formed on the dielectric. Anode and cathode terminations are added to facilitate attachment of the capacitor to an electrical circuit.

The desire to improve capacitors has led to the evaluation, and use, of tantalum and niobium powders with ever increasing capacitance as a function of volume. The powders, referred to in the art as high CV powders, are desired because of their reduced power consumption. Unfortunately, with increased formation voltage these powders exhibit a phenomenon referred to as CV roll down which limits the application of high CV powder in high working voltage capacitors. The phenomenon, which is known in both Ta and Nb capacitors, is believed to be caused by the growth of anodic oxide films through the necks between powder particles. These oxide films clog the pores between the particles in sintered anodes thereby resulting in reduced anode surface area. The reduced anode surface area, as a function of volume, is believed to contribute to CV roll down.

The dielectric is typically an amorphous oxide matrix of the underlying anode metal. It is difficult to increase the formation voltage of high CV powders due to the precipitation of a crystalline oxide phase in the amorphous matrix of the anodic oxide film. Crystalline inclusions in the amorphous oxide are believed to inhibit the formation of a thick dielectric film on the anode surface which provokes high and unstable d.c. leakage. These precipitates are typically associated with impurities, particularly bulk oxygen, in Ta(Nb) anodes. This has led to efforts to reduce the oxygen concentration in Ta(Nb) anodes.

U.S. Pat. Nos. 5,825,611 and 6,410,083 and 6,554,884 are representative of attempts to address the crystalline oxide problem by treating the Ta or Nb anodes with nitrogen to purge oxides while limiting nitride precipitates. U.S. Pat. No. 4,537,641 describes the reduction of bulk oxygen content in Ta(Nb) anodes by adding reducing agent to the anodes. Mg, for example, was added to the anode and the anodes were heated above the melting point of the reducing agent but below the temperature conventionally used for sintering. During the heating, the reducing agent reacts with oxygen in Ta(Nb), creating magnesium oxides on the anode surface. These magnesium oxides are then leached in aqueous solutions, for instance diluted sulfuric acid and hydrogen peroxide, when anodes are exposed to air after sintering.

An alternative process, based on the combination of sintering and deoxidizing, is disclosed in U.S. Pat. No. 6,447,570. According to the process, the Ta(Nb) powder is pressed into a pellet and Mg is added to the pellets. The pellets and Mg are placed in crucibles in a vacuum oven, or covered with inert gas and heat treated to generate Mg vapor. The Mg vapor reacts with oxygen thereby effectively deoxidizing the Ta(Nb). The deoxidized Ta(Nb) is then sintered in vacuum or inert gas. Due to the decrease in oxygen concentration the sintering can be done at lower temperatures. Sintering at lower temperatures results in improved morphology of the sintered anodes and a stronger bond between the powder particles and lead wire. After sintering, the pellets are cooled and simultaneously treated with nitrogen to reduce Ta(Nb) affinity for oxygen. After cooling the Mg oxide is leached from the anode surface in diluted water solution, preferably of $H_2SO_4$ and $H_2O_2$, leaving bulk Ta(Nb) particles which are practically free of oxygen. The improved morphology, low oxygen, and strong powder-to-wire bonding in Ta(Nb) anodes results in high volumetric efficiency and low d.c. leakage in the finished Ta(Nb) capacitors. The disadvantage of the technology is the complexity and inefficiency of the equipment required. During deoxidizing, Mg vapor spreads through the reaction chamber and condenses on all cold parts including electrical insulation on the heaters. During consequent sintering in vacuum, or in inert gas, Mg shunts can cause shortage of the power and control circuits. This method therefore requires an extensive, and frequent, cleaning procedure to remove residual Mg which typically must be performed after each run of the furnace. These problems prohibit large scale production.

The art is still lacking a method of providing a capacitor which achieves the potential offered by high CV powders. Either the adhesion between the lead wire and pressed powder is insufficient or the manufacturing process is inoperative on a large scale. Those of skill in the art are still seeking a method of utilizing high CV Ta(Nb) powders and full realization of the potential suggested thereby. Such a method is provided by the present invention.

SUMMARY OF THE INVENTION

It is an object of the present invention to provide an improved capacitor.

It is another object of the present invention to provide a capacitor which fully exploits the advantages offered by high CV tantalum and niobium powders.

A particular advantage of the present invention is the ability to provide a method of forming a capacitor, and a capacitor formed thereby, wherein high CV tantalum and niobium powders can be exploited without the deficiencies of the prior art.

A particular feature of the present invention is the ability to implement the improvements in conventional manufacturing equipment, using standard practices, without the necessity for extensive procedures as required in the prior art.

These and other features, as will be realized, are provided in a capacitor. The capacitor has an anode lead and an anode with the anode lead extending there from. The anode has an inner region encasing a portion of the anode lead and an outer region encasing at least a portion of the inner region wherein the inner region has a higher density than the outer region. A dielectric is on the anode and a conductor is on the dielectric.

Yet another embodiment is provided in a process for forming an anode comprising:
a) pressing a powder into a pellet around a lead wire wherein the pellet has a non-uniform density with a higher density region around the lead wire and a lower density region exterior to the higher density region;
b) heating the pellet in the presence of Mg to a temperature sufficient to vaporize the Mg and sintering the pellet thereby forming magnesium oxide; and
c) removing the magnesium oxide from the pellet.

BRIEF DESCRIPTION OF FIGURES

FIG. 2 is a flow chart representation of an embodiment of the present invention.

DETAILED DESCRIPTION OF THE INVENTION

Figure 1:
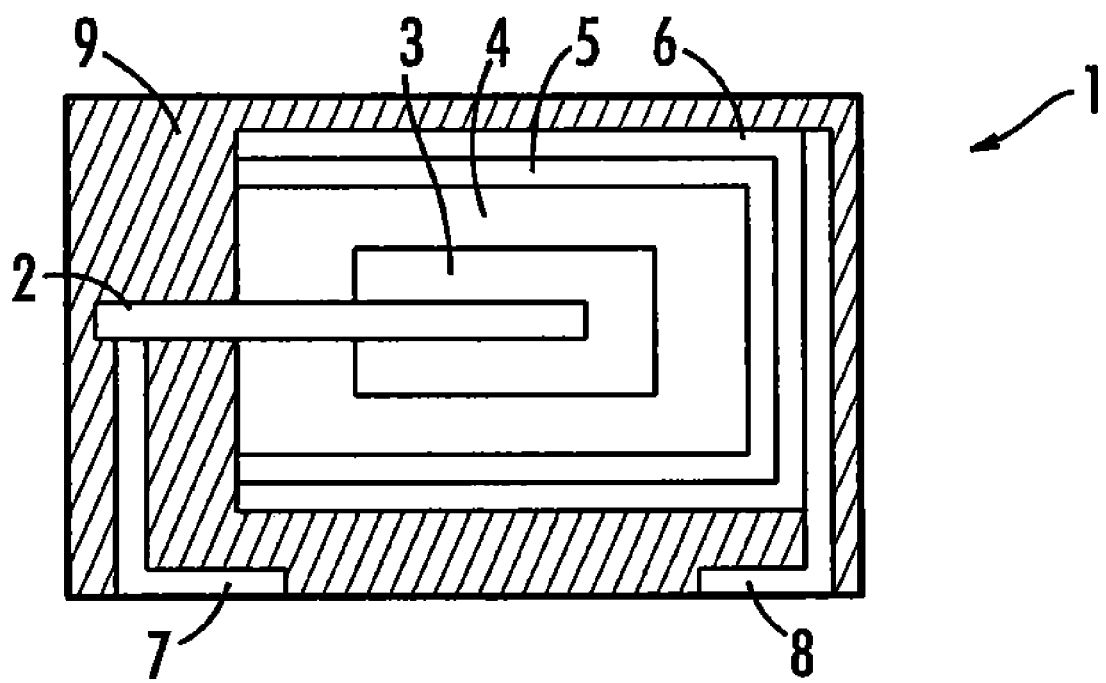
FIG. 1 is a cross-sectional schematic view of an embodiment of the present invention.

This invention provides high volumetric efficiency and low d.c. leakage Ta(Nb) capacitors by pressing Ta(Nb) pellets with non uniform density. In particulary, the pellet has a higher density around an embedded lead wire and a lower density further from the embedded lead wire. The pellet is sintered and deoxidized simultaneously in a conventional deoxidizing furnace.

Throughout the instant specification references to tantalum and niobium are interchangeable and Ta(Nb) refers to tantalum, niobium or combinations thereof.

The present invention will be described with reference to the figures forming an integral non-limiting part of the present invention. In the various figures similar elements will be numbered accordingly.

An embodiment of the present invention will be described with reference to FIG. 1. A capacitor of the present invention is illustrated in cross-sectional schematic view in FIG. 1. The capacitor, generally represented at 1, comprises an anode wire, 2, embedded in an anode. The anode comprises an inner region, 3, encasing a portion of the anode wire, and an outer region, 4, encasing at least a portion of the inner region. The inner region has a higher density than the outer region as will be more fully described herein. The inner region and outer region are shown as discrete regions with a clear line of demarcation therebetween. In one embodiment discrete regions are preferred, particularly, due to the ease of manufacture. In another embodiment a density gradient is formed wherein the density increases in the vicinity of the wire. When a density gradient is used the inner region is that region with a density above the average density of the entire anode and the outer region is that region with a density below the average density of the entire anode. A dielectric, 5, is formed on the surface of the anode, corresponding to the surface of outer region, and a conductive layer, 6, is formed on the dielectric. The conductive layer functions as the cathode of the capacitor. An optional anode termination, 7, is in electrical contact with the anode lead and an optional cathode termination, 8, is in electrical contact with the cathode layer. The anode termination and cathode termination function as an attachment point to an electrical circuit and may be eliminated if the cathode and/or anode are directly attached to an electrical circuit or if the capacitor is to be used as an embedded capacitor. An optional, but preferred, encasement, 9, protects the capacitor from inadvertent electrical contact with other components in a circuit and physically protects the capacitor during manufacture, transport and use. The encasement is preferably a material which is not electrically conducting and is preferably a non-conducting polymer.

The non uniform pressing with maximum density around the lead wire is preferably performed by multi-stage compaction. In this method the higher density inner region is compacted around the wire following by compaction of a lower density outer region farther from the wire. This can be accomplished by using multiple punches in a single die, or by using multiple dies.

The density of the inner region is higher than the density of the outer region.

For tantalum it is preferable that the inner region have a density of at least about 8 gm/cm$^3$ to no more than about 12 gm/cm$^3$ and that the outer region have a density of at least about 4 gm/cm$^3$ to no more than about 10 gm/cm$^3$. It is also preferable with tantalum that a the inner region density and the outer region density differ by at least about 1 g/cm$^3$ and preferably no more than about 8 g/cm$^3$.

For niobium it is preferable that the inner region have a density of at least about 4 gm/cm$^3$ to no more than about 6 gm/cm$^3$ and that the outer region have a density of at least about 2 gm/cm$^3$ to no more than about 5 gm/cm$^3$. It is also preferable with niobium that a the inner region density and the outer region density differ by at least about 0.5 g/cm$^3$ and preferably no more than about 4 g/cm$^3$.

The size of the inner region is selected to be sufficiently large to encase a portion of the lead wire but no so large as to limit capacitance. It is most preferable that the inner region represents no more than about 33% of the volume of the anode and more preferably no more than about 3.3% of the volume of the anode.

Pressing the inner region to a higher density insures that the Ta particles are tightly connected to each other and to the wire by high mechanical pressure. This improves the properties of the eventual capacitor.

The method of the present invention will be described with reference to the flow chart of FIG. 2. The order of steps in FIG. 2 is provided to facilitate discussion and the invention is not limited thereby. To the extent possible the order of steps can be rearranged, combined or further separated into sub-steps unless stated to the contrary. An anode lead is provided at 20 and an inner region is formed around the anode wire by pressed at 21. An outer region is formed around the inner region by pressing at 22. As realized from the discussion herein the inner region is pressed to a higher density than the outer region and this difference can be accomplished in successive pressings or concurrently. The anode with two regions and an anode lead extending therefrom is referred to herein as an anode precursor. The anode precursor is combined with magnesium at 23 and heated at 24 to a temperature sufficient to deoxidize and sinter the anode. It is preferable that the temperature is at least 800° C. and does not exceed about 1,200° C. The magnesium oxide is then removed from the anode at 25. In a particularly preferred embodiment the magnesium oxide is removed from the sintered anode by leaching. An aqueous solution with 5-25%, and more preferably about 15%, $H_2O_2$ and 2-10% and more preferably about 6%, $H_2SO_4$ is particularly preferred. A dielectric is then formed on the leached anode at 26. In a particularly preferred embodiment the dielectric is formed by electrolytic oxidation wherein an oxide of the anode material is formed on the surface of the anode. A cathode is formed on the surface of the dielectric at 27. The anode, dielectric and cathode form a functioning capacitor and it can be used without further processing if so desired. In an optional, but preferred step, anode and cathode terminations are added at 28 to provide a convenient manner for attaching the capacitor to an electrical circuit. In an optional, but preferred step, the entire capacitor except for a portion of the anode and cathode terminations is encased at 29.

A particular advantage offered by the present invention is the ability to avoid the use of a vacuum oven or an oven suitable for heating under inert atmosphere. In particular a vacuum oven typically must have heating elements, and therefore electrical connections, in the heating chamber. Magnesium vapor condenses on various components which causes significant clean-up issues. With the present invention the anode and magnesium are loaded into a tube, the tube sealed and then the tube is inserted into a tube furnace. There are no heating elements, or electrical connections, in the tube and the tube is at ambient pressure. It is acknowledged that the pressure will increase during heating, however, by the term "ambient pressure" as used herein indicates the initial pressure.

When oxygen is removed from Ta(Nb) particles the sintering mechanism is different than that which occurs with conventional sintering. The dominant sintering mechanism with conventional sintering is bulk diffusion of tantalum or niobium atoms wherein powder particles penetrate into one-another. This diffusion causes anode shrinkage. With lower oxygen level concentrations the dominant sintering mechanism is surface diffusion of Ta(Nb) atoms. The atoms are moving from convex to concave areas of the particles and to the wire surface resulting in the building up of necks between the powder particles and between the particles and the wire while also opening pores between the particles. This sintering mechanism dominates at deoxidizing temperature, which is much lower than the temperature of conventional sintering, resulting in anode expansion instead of shrinkage. Maximum press density around the lead wire allows strong powder-to-wire bonding at deoxidizing which eliminates a need for additional sintering after deoxidizing. Anodes manufactured by the present invention have thick necks between the powder particles, open pores, very low oxygen concentration, and strong powder-to-lead bonds. All this provides high volumetric efficiency and low d.c. leakage to Ta(Nb) capacitors. The method also eliminates the need for complex and inefficient equipment and a long expensive maintenance procedure.

The anode lead is a conductor preferably, but not limited to, the same material as the anode. It is most preferable that the anode lead be a high density tantalum or niobium wire. The cross-sectional shape of the anode wire is not particularly limited with round, obround, oblong and elliptical being preferred due to the improved contact between the pressed powder and lead. Other shapes, such as polygonal shapes, are suitable but less desirable. It is preferred that the anode lead have an aspect ratio of greater than 1 wherein the aspect ratio is the highest ratio of lengths of orthogonal cross-sectional lengths.

The cathode is a conductor preferably comprising at least one of manganese dioxide and a conductive polymeric material. Particularly preferred conductive polymers include polypyrrole, polyaniline and polythiophene. Metals can be employed as a cathode material with valve metals being less preferred. The cathode may include multiple layers wherein adhesion layers are employed to improved adhesion between the conductor and the termination. Particularly preferred adhesion layers include carbon, silver, copper, or another conductive material in a binder.

The dielectric is a non-conductive layer which is not particularly limited herein. The dielectric may be a metal oxide or a ceramic material. A particularly preferred dielectric is the oxide of a metal anode due to the simplicity of formation and ease of use.

EXAMPLE

Rectangular anodes of 3.1 mm×4.5 mm×1.6 mm were pressed using Ta powder with 50,000 uFV/g weight efficiency. A 0.2 mm diameter Ta wire was embedded into the anodes during the pressing. For the inventive sample an area with 1.2 mm diameter and 10 gm/cm$^3$ density was created around the wire by first compaction in the first die followed by loading into the second die where the rest of the anode was compacted with 6 g/cm$^3$ density. For Control 1 anodes of the same size were pressed with a single density of 6 gm/cm$^3$. The dual density and single density anodes were placed in tube with Mg chunks and deoxidized at about 1000° C. during 3 hours in a tube furnace at ambient pressure. The anodes were exposed to air, leached from Mg oxide in diluted water solution of $H_2SO_4$ and $H_2O_2$ and formed in 0.1% vol. phosphoric acid to 75 V. Control 2 anodes were prepared in accordance with U.S. Pat. No. 6,447,570 including heating in a vacuum oven. Control 3 anodes were pressed as Control 2 and sintered in a vacuum oven in accordance with standard practice in the art. The Table below shows the average from at least 10 measurements of wire pull strength, oxygen content, volumetric efficiency (CV/cm$^3$), and d.c. leakage (DCL) of these anodes in comparison to anodes sintered according to prior art and conventional sintering in vacuum.

TABLE

| Process | Wire Pull Strength (Kg) | Oxygen (ppm) | CV/cm$^3$ μFV/cm$^3$ | DCL nA/CV |
|---|---|---|---|---|
| Inventive | 7.2 | 2500 | 255,000 | 0.12 |
| Control 1 | 0.85 | | | |
| Control 2 | 5.6 | 2540 | 250,000 | 0.12 |
| Control 3 | 7.2 | 4850 | 216,000 | 0.27 |

As one can see from the Table, the invention provides high wire pull strength. The wire pull strength actually exceeds the strength of the wire itself leading to snapping of the wire during testing. The wire pull strength in control anodes with single density (Control 1) was so low, that further testing of these anodes became impossible. Oxygen content, volumetric efficiency and DCL with the inventive sample were similar to the prior art processes and much better than these with conventional sintering. At the same time the inventive process allowed usage of a simple deoxidizing tube furnace without additional maintenance. Since the prior art required a special complex vacuum furnace which allows magnesium vapor to form on the oven components a long and difficult cleaning must be done after each run of the furnace. This was not necessary in the inventive example since the tube could be reused or discarded.

The process of this invention is useful in the capacitor industry to supply components to the electronics industry.

The invention has been described in terms of preferred embodiments. Modifications apparent to those with skill in the art are included within the scope of the invention.

The invention claimed is:
1. A process for forming an anode comprising:
  a) pressing a powder into a pellet around a lead wire wherein said pellet has a non-uniform density with a higher density region around said lead wire and a lower density region exterior to said higher density region;

b) heating said pellet in the presence of Mg to a temperature sufficient to vaporize said Mg and sinter said pellet thereby forming magnesium oxide; and c) removing said magnesium oxide from said pellet.

2. The process for forming an anode of claim 1 wherein said pressing comprises multi-stage compaction.

3. The process for forming an anode of claim 1 wherein said pressing comprises compacting said high density region around said wire following by compacting said lower density region around said higher density region.

4. The process for forming an anode of claim 1 wherein said pressing comprises a process selected from multiple presses in a single die and presses in multiple dies.

5. The process for forming an anode of claim 1 wherein said powder is tantalum.

6. The process for forming an anode of claim 5 wherein said higher density region has a density of at least about 8 g/cm$^3$ to about 12 g/cm$^3$.

7. The process for forming an anode of claim 5 wherein said lower density region has a density of at least about 4 g/cm$^3$ to about 10 g/cm$^3$.

8. The process for forming an anode of claim 5 wherein density of said lower density region and said density of higher density region differ by at least about 1 g/cm$^3$ to no more than about 8 g/cm$^3$.

9. The process for forming an anode of claim 1 wherein said powder is niobium.

10. The process for forming an anode of claim 9 wherein said higher density region has a density of at least about 4 g/cm$^3$ to about 6 g/cm$^3$.

11. The process for forming an anode of claim 9 wherein said lower density region has a density of at least about 2 g/cm$^3$ to about 5 g/cm$^3$.

12. The process for forming an anode of claim 9 wherein density of said lower density region and said density of higher density region differ by at least about 0.5 g/cm$^3$ to no more than about 4 g/cm$^3$.

13. The process for forming an anode of claim 1 wherein said higher density region represents no more than 33% of anode volume.

14. The process for forming an anode of claim 13 wherein said higher density region represents no more than 3.3% of said anode volume.

15. The process for forming an anode of claim 1 comprising removing said magnesium oxide by leaching.

16. The process for forming an anode of claim 15 comprising removing said magnesium oxide by leaching with an aqueous solution comprising $H_2O_2$ and $H_2SO_4$.

17. The process for forming an anode of claim 1 wherein said temperature sufficient to vaporize said Mg and sinter said pellet is at least about 800° C. to no more than about 1,200° C.

18. The process for forming an anode of claim 1 wherein said heating is in a sealed vessel.

19. The process for forming an anode of claim 18 wherein said sealed vessel is loaded at ambient pressure.

20. A process for forming a capacitor comprising:
forming an anode in accordance with claim 1;
forming a dielectric on said anode; and
forming a cathode on said dielectric.

21. The process for forming a capacitor of claim 20 further comprising:
attaching an anode termination to said lead wire.

22. The process for forming a capacitor of claim 20 further comprising:
attaching a cathode termination to said cathode.

23. The process for forming a capacitor of claim 20 further comprising:
encasing at least a portion of said capacitor in a non-conductor.

24. The process for forming a capacitor of claim 20 wherein said dielectric is an oxide.

25. The process for forming a capacitor of claim 20 wherein said cathode comprises at least one material selected from a metal, manganese dioxide and a conductive polymer.

26. The process for forming a capacitor of claim 25 wherein said conductive polymer is selected from the group consisting of polypyrrole, polyaniline and polythiophene.

* * * * *